(12) United States Patent
Xu

(10) Patent No.: US 11,879,627 B1
(45) Date of Patent: Jan. 23, 2024

(54) HEAT DISSIPATION STRUCTURE FOR SEALED OPTICAL MACHINES

(71) Applicant: Yi Xu, Guangdong (CN)

(72) Inventor: Yi Xu, Guangdong (CN)

(73) Assignee: Xihe Technology (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 18/115,815

(22) Filed: Mar. 1, 2023

(30) Foreign Application Priority Data

Aug. 3, 2022 (CN) .......................... 202222049911.6

(51) Int. Cl.
*F21V 29/67* (2015.01)
*G03B 21/16* (2006.01)
*F21V 29/503* (2015.01)
*F21V 29/71* (2015.01)

(52) U.S. Cl.
CPC ............ *F21V 29/503* (2015.01); *F21V 29/67* (2015.01); *F21V 29/71* (2015.01); *G03B 21/16* (2013.01)

(58) Field of Classification Search
CPC ....... G03B 21/16; F21V 29/67; F21V 29/673; F21V 29/677
See application file for complete search history.

(56) References Cited

U.S. PATENT DOCUMENTS

| | | | |
|---|---|---|---|
| 2020/0096848 A1* | 3/2020 | Xu | G02B 27/286 |
| 2020/0209722 A1* | 7/2020 | Xu | G02F 1/133385 |
| 2020/0267357 A1* | 8/2020 | Zhang | G03B 21/006 |
| 2020/0301265 A1* | 9/2020 | Yan | H04N 9/3152 |

* cited by examiner

*Primary Examiner* — Sean P Gramling

(57) ABSTRACT

A new heat dissipation structure for sealed optical machines comprises an optical machine housing, an LED light source, a light cone, a first Fresnel lens, heat insulating glass, a liquid crystal screen, a second Fresnel lens, and a reflector; the upper part of the optical machine housing is installed with a second heat dissipation fan. The invention adopts two independent heat dissipation systems inside and outside, which can greatly increase the heat dissipation performance of the optical machine, and the external heat sink of the external heat dissipation system and the light heat sink share a fan in parallel, simplifying the structure and reducing the cost. The second heat dissipation fan is integrated with the optical machine shell, which effectively reduces the height of the optical machine, reduces the volume of the optical machine, and achieves a better internal circulation, further improving the heat dissipation efficiency.

6 Claims, 3 Drawing Sheets

HEAT DISSIPATION STRUCTURE FOR SEALED OPTICAL MACHINES

1. TECHNICAL FIELD

The invention relates to the field of projectors, in particular to a new heat dissipation structure for sealed optical machines.

2. BACKGROUND ART

A projector comprises light source components, optical modules, etc., so it will generate a lot of heat when it is used, and this heat needs to be removed in time, otherwise the service life of the entire device will be reduced. Since the current projectors share a heat dissipation system, the internal air flow is disturbed, and the heat dissipation effect is extremely poor. After a long time of use, good heat dissipation cannot be achieved, and the service life is reduced.

3. SUMMARY OF THE INVENTION

The technical problem to be solved by the invention is to provide a new heat dissipation structure for sealed optical machines, which adopts two independent heat dissipation systems to deal with internal and external heat dissipation respectively; the external heat dissipation fins of the external heat dissipation system and the lamp heat dissipation fins are arranged side by side to share a fan, which simplifies the structure and reduces the cost. In addition, the internal heat dissipation fan is horizontal to the internal radiator, located above the reflector, and the internal radiator is placed horizontally, located below the reflector, to achieve a better internal circulation and further improve the heat dissipation efficiency, which meets the heat dissipation requirements of the current projector for a long time, and increases the overall service life.

The invention is realized by the following technical solutions: a new heat dissipation structure for sealed optical machines, comprising an optical machine housing, an LED light source, a light cone, a first Fresnel lens, heat insulating glass, a liquid crystal screen, a second Fresnel lens, and a reflector; the upper part of the optical machine housing is installed with a second heat dissipation fan; the LED light source, the light cone, the first Fresnel lens, the heat insulating glass, the liquid crystal screen, the second Fresnel lens, and the reflector are arranged in sequence inside the optical machine housing; a first heat dissipation fan is located on the front side of the LED light source and the light cone, and the second heat dissipation fan is located above the reflector; the shell of the second heat dissipation fan is integrated with the structure of the optical machine; a lens is located on the front side of the reflector;

the lower part of the optical machine housing is installed with an LED light source radiator, an external radiator, and an internal radiator; the LED light source radiator, the external radiator, and the internal radiator are arranged in sequence;

a sealed space is formed between the interface of the optical machine housing, the internal radiator, and the external radiator and the first Fresnel lens; the airflow blown by the second heat dissipation fan in the sealed space is guided by the housing and then flows through the liquid crystal screen with a higher temperature; after taking away the heat from the liquid crystal screen, the airflow will exchange heat with the internal radiator to cool down, and then flow back to the second heat dissipation fan after passing through the reflector; the external radiator and the LED light source radiator are located at the same horizontal position; the airflow blown out by the first heat dissipation fan passes through the inclined surface of the optical machine housing and then enters the external radiator and the LED light source radiator, taking away the heat from the LED light source and the sealed space.

Preferably, the optical machine housing is divided into upper and lower parts; an optical module and the fans are located in the upper part of the housing, and the radiator components are located in the lower part of the housing.

Preferably, the first heat dissipation fan is arranged on the side of the external radiator and the LED light source radiator; the external radiator and the LED light source radiator are arranged side by side, and both share the first heat dissipation fan; the other end of the optical machine housing away from the first heat dissipation fan is provided with an air outlet; the external airflow is inhaled by the first heat dissipation fan and blown to the external radiator and the LED light source radiator, and the hot air is discharged from the air outlet.

Preferably, the second heat dissipation fan is arranged horizontally to the internal radiator and is located on the upper part of the reflector; the airflow blown by the second heat dissipation fan in the sealed space is guided by the housing and then flows through the liquid crystal screen with a higher temperature; after taking away the heat from the liquid crystal screen, the airflow will exchange heat with the internal radiator to cool down, and then flow back to the second heat dissipation fan after passing through the reflector, so as to form a closed "O"-shaped heat dissipation air path to complete the heat dissipation cycle.

Preferably, the optical module comprises the first Fresnel lens, the heat insulating glass, the liquid crystal screen, the second Fresnel lens, and the reflector; the reflector is arranged at the output end of the second Fresnel lens and is inclined, and the reflective surface of the reflector faces the lens; the liquid crystal screen, the heat insulating glass, and the first Fresnel lens are sequentially arranged on one side of the second Fresnel lens, and are located at the output end of the optical module.

Preferably, the lower end of the heat insulating glass is inclined towards the liquid crystal screen, which reduces the width of the air duct and increases the airflow velocity at this position, thereby enhancing the heat exchange capacity at this position.

The beneficial effects of the invention are:
1. the invention has two independent heat dissipation systems inside and outside, which are used for independent heat dissipation of different components, so that the airflow is smoother and not disturbed during heat dissipation, and the heat generated by each component during use can reduce accumulation.
2. The external heat sink of the external heat dissipation system of the invention and the light heat sink share a fan in parallel, which simplifies the structure, reduces the cost, and makes the structural design more reasonable.
3. The second heat dissipation fan of the invention is horizontal to the internal heat sink, located above the reflector, and the internal radiator is located below the reflector, so that the airflow is more smooth and achieves a better internal circulation, the heat dissipation efficiency is further improved to meet the heat dissipation requirements of the current projector for a long time.

4. The shell of the second heat dissipation fan of the invention is integrated with the housing, which can reduce the height of the optical machine.

4. BRIEF DESCRIPTION OF ACCOMPANY DRAWINGS

In order to explain the embodiments of the invention or the technical solutions in the prior art more clearly, the drawings that need to be used in the description of the embodiments or the prior art will be introduced hereinafter. Obviously, the drawings in the following description are only some embodiments of the invention. For those of ordinary skill in the art, other drawings may be obtained from these drawings without creative efforts.

5. SPECIFIC EMBODIMENT OF THE INVENTION

All the features disclosed in the specification, or all disclosed methods or steps in the process, except for mutually exclusive features and/or steps, can be combined in any manner.

Any feature disclosed in the specification (including any appended claims, abstract and drawings), unless specifically stated, can be replaced by other equivalent or equivalent alternative features. That is, unless otherwise stated, each feature is just one example of a series of equivalent or similar features.

Figure 1:
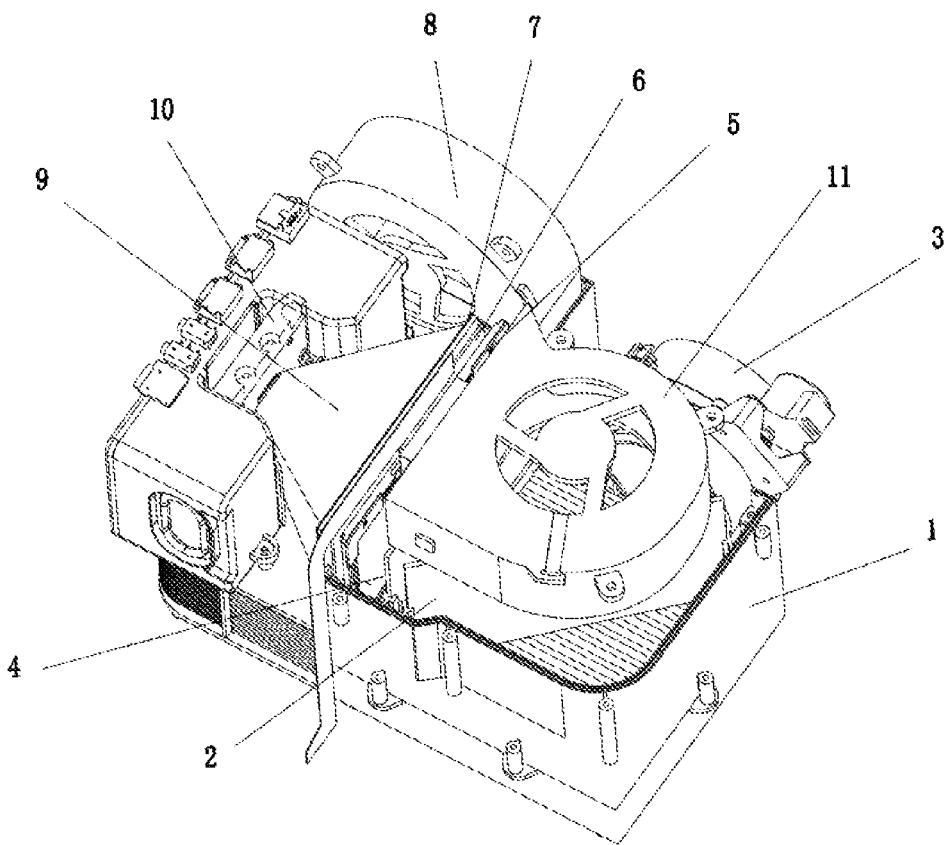
FIG. 1 is a schematic diagram of the internal structure according to the invention.
Figure 2:
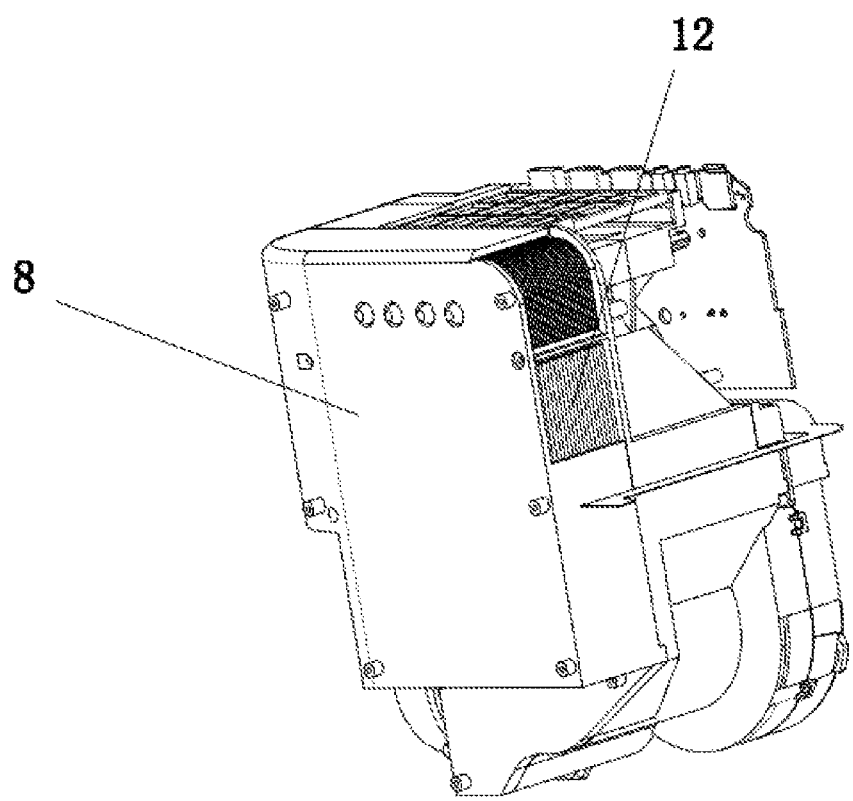
FIG. 2 is a schematic diagram of the overall back structure according to the invention.
Figure 3:
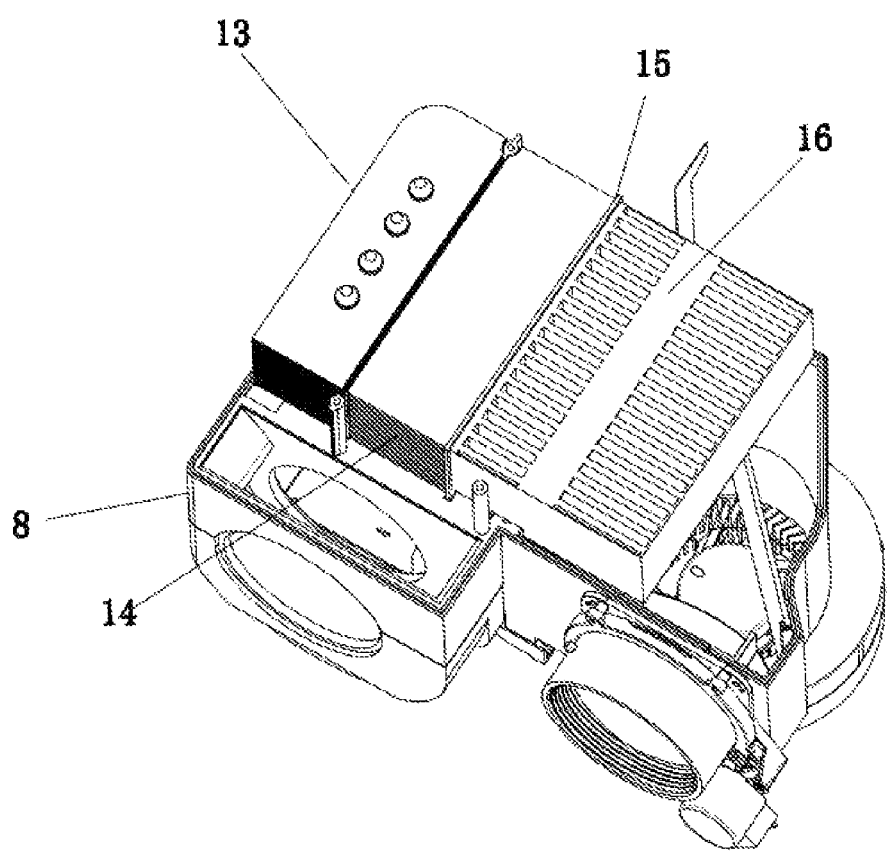
FIG. 3 is a schematic diagram of the heat dissipation system according to the invention.

As shown in FIG. 1, a new heat dissipation structure for sealed optical machines, comprising an optical machine housing 1, an LED light source 10, a light cone 9, a first Fresnel lens 7, heat insulating glass 6, a liquid crystal screen 5, a second Fresnel lens 4, and a reflector 2; the upper part of the optical machine housing is installed with a second heat dissipation fan 11; the LED light source 10, the light cone 9, the first Fresnel lens 7, the heat insulating glass 6, the liquid crystal screen 5, the second Fresnel lens 4, and the reflector 2 are arranged in sequence inside the optical machine housing; a first heat dissipation fan 8 is located on the front side of the LED light source and the light cone 9, and the second heat dissipation fan 11 is located above the reflector;

As shown in FIGS. 2 and 3, the lower part of the optical machine housing is installed with an LED light source radiator 13, an external radiator 14, and an internal radiator 16; the LED light source radiator 13, the external radiator 14, and the internal radiator 16 are arranged in sequence;

a sealed space is formed between the interface of the optical machine housing 1, the internal radiator 16, and the external radiator 15 and the first Fresnel lens 7; the airflow blown by the second heat dissipation fan 11 in the sealed space is guided by the housing and then flows through the liquid crystal screen 5 with a higher temperature; after taking away the heat from the liquid crystal screen, the airflow will exchange heat with the internal radiator 16 to cool down, and then flow back to the second heat dissipation fan 11 after passing through the reflector 2 to complete the heat dissipation cycle;

the external radiator 14 and the LED light source radiator 13 are located at the same horizontal position; the airflow blown out by the first heat dissipation fan 8 passes through the inclined surface of the optical machine housing and then enters the external radiator 14 and the LED light source radiator 13, taking away the heat from the LED light source 10 and the sealed space.

The optical machine housing 1 is divided into upper and lower parts; an optical module and the fans are located in the upper part of the housing, and the radiator components are located in the lower part of the housing.

The first heat dissipation fan 8 is arranged on the side of the external radiator 14 and the LED light source radiator 13; the external radiator 14 and the LED light source radiator 13 are arranged side by side, and both share the first heat dissipation fan; the other end of the optical machine housing away from the first heat dissipation fan is provided with an air outlet 12; the external airflow is inhaled by the first heat dissipation fan 8 and blown to the external radiator 14 and the LED light source radiator 13, and the hot air is discharged from the air outlet 12.

The second heat dissipation fan 11 is arranged horizontally to the internal radiator 16 and is located on the upper part of the reflector 2; the airflow blown by the second heat dissipation fan 11 in the sealed space is guided by the housing and then flows through the liquid crystal screen 5 with a higher temperature; after taking away the heat from the liquid crystal screen, the airflow will exchange heat with the internal radiator 16 to cool down, and then flow back to the second heat dissipation fan 11 after passing through the reflector 2, so as to form a closed "O"-shaped heat dissipation air path to complete the heat dissipation cycle. Part of the arrow in FIG. 3 is the direction of the second heat dissipation air path, forming an "O"-shaped heat dissipation air path. By setting an inclined guide surface, the airflow direction can be smoother, and an "O"-shaped air path is better formed, and the air flow is not disturbed.

The optical module comprises the first Fresnel lens 7, the heat insulating glass 6, the liquid crystal screen 5, the second Fresnel lens 4, and the reflector 2; the reflector 2 is arranged at the output end of the second Fresnel lens 4 and is inclined, and the reflective surface of the reflector 2 faces the lens 3; the liquid crystal screen 5, the heat insulating glass 6, and the first Fresnel lens 7 are sequentially arranged on one side of the second Fresnel lens 4, and are located at the output end of the optical module.

The lower end of the heat insulating glass 6 is inclined towards the liquid crystal screen 5, which reduces the width of the air duct and increases the airflow velocity at this position, thereby enhancing the heat exchange capacity at this position.

The above are only specific embodiments of the invention, but the protection scope of the invention is not limited thereto. Any modifications or substitutions creative efforts shall all fall within protection scope of the invention. Therefore, the protection scope of the invention should be subject to the protection scope defined by the claims.

What is claimed is:

1. A new heat dissipation structure for sealed optical machines, comprising an optical machine housing (1), an LED light source (10), a light cone (9), a first Fresnel lens (7), heat insulating glass (6), a liquid crystal screen (5), a second Fresnel lens (4), and a reflector (2); an upper part of the optical machine housing is installed with a second heat dissipation fan (11); the LED light source (10), the light cone (9), the first Fresnel lens (7), the heat insulating glass (6), the liquid crystal screen (5), the second Fresnel lens (4), and the reflector (2) are arranged in sequence inside the optical machine housing; a first heat dissipation fan (8) is located on a front side of the LED light source and the light cone (9), and the second heat dissipation fan (11) is located above the reflector; a shell of the second heat dissipation fan is integrated with a structure of the optical machine; a lens (3) is located on a front side of the reflector (2);
- a lower part of the optical machine housing is installed with an LED light source radiator (13), an external radiator (14), and an internal radiator (16); the LED light source radiator (13), the external radiator (14), and the internal radiator (16) are arranged in sequence;
- a sealed space is formed between an interface of the optical machine housing (1), the internal radiator (16), and the external radiator (15) and the first Fresnel lens (7); the airflow blown by the second heat dissipation fan (11) in the sealed space is guided by the housing and then flows through the liquid crystal screen (5) with a higher temperature; after taking away the heat from the liquid crystal screen, the airflow will exchange heat with the internal radiator (16) to cool down, and then flow back to the second heat dissipation fan (11) after passing through the reflector (2);
- the external radiator (14) and the LED light source radiator (13) are located at the same horizontal position; the airflow blown out by the first heat dissipation fan (8) passes through an inclined surface of the optical machine housing and then enters the external radiator (14) and the LED light source radiator (13), taking away the heat from the LED light source (10) and the sealed space.

2. The new heat dissipation structure for sealed optical machines of claim 1, wherein the optical machine housing (1) is divided into upper and lower parts; an optical module and the fans are located in the upper part of the housing, the optical module comprises the first Fresnel lens, the heat insulation glass, and the radiator components are located in the lower part of the housing.

3. The new heat dissipation structure for sealed optical machines of claim 1, wherein the first heat dissipation fan (8) is arranged on the side of the external radiator (14) and the LED light source radiator (13); the external radiator (14) and the LED light source radiator (13) are arranged side by side, and both share the first heat dissipation fan; an other end of the optical machine housing away from the first heat dissipation fan is provided with an air outlet (12); the external airflow is inhaled by the first heat dissipation fan (8) and blown to the external radiator (14) and the LED light source radiator (13), and the hot air is discharged from the air outlet (12).

4. The new heat dissipation structure for sealed optical machines of claim 1, wherein the second heat dissipation fan (11) is arranged horizontally to the internal radiator (16) and is located on the upper part of the reflector (2); the airflow blown by the second heat dissipation fan (11) in the sealed space is guided by the housing and then flows through the liquid crystal screen (5) with a higher temperature; after taking away the heat from the liquid crystal screen, the airflow will exchange heat with the internal radiator (16) to cool down, and then flow back to the second heat dissipation fan (11) after passing through the reflector (2), so as to form a closed "O"-shaped heat dissipation air path.

5. The new heat dissipation structure for sealed optical machines of claim 2, wherein the optical module comprises the first Fresnel lens (7), the heat insulating glass (6), the liquid crystal screen (5), the second Fresnel lens (4), and the reflector (2); the reflector (2) is arranged at the output end of the second Fresnel lens (4) and is inclined, and the reflective surface of the reflector (2) faces the lens (3); the liquid crystal screen (5), the heat insulating glass (6), and the first Fresnel lens (7) are sequentially arranged on one side of the second Fresnel lens (4), and are located at the output end of the optical module.

6. The new heat dissipation structure for sealed optical machines of claim 5, wherein a lower end of the heat insulating glass (6) is inclined towards the liquid crystal screen (5) to increase the air velocity.

* * * * *